US006472039B1

(12) United States Patent
Amen-Ra A

(10) Patent No.: US 6,472,039 B1
(45) Date of Patent: Oct. 29, 2002

(54) BODY APPLIQUE AND METHOD THEREFOR

(76) Inventor: Adolph Amen-Ra A, 2 Breeze Ave., #202, Venice, CA (US) 90271

( * ) Notice: Subject to any disclaimer, the term of this patent is extended or adjusted under 35 U.S.C. 154(b) by 0 days.

(21) Appl. No.: 09/547,562

(22) Filed: Apr. 11, 2000

Related U.S. Application Data

(60) Provisional application No. 60/137,263, filed on Jun. 2, 1999.

(51) Int. Cl.$^7$ .................................................. B32B 33/00

(52) U.S. Cl. .................. 428/42.1; 428/40.1; 428/542.2; 428/913.3; 63/DIG. 1; 63/14.9

(58) Field of Search ............................... 428/42.1, 40.1, 428/343, 354, 542.2, 913.3, 15, 67; 63/DIG. 1, 14.9, DIG. 3

(56) References Cited

U.S. PATENT DOCUMENTS

| | | | | |
|---|---|---|---|---|
| 1,238,046 A | | 8/1917 | Nuss | 163/478 |
| 2,013,290 A | | 9/1935 | Rohrbach | 63/2 |
| 3,478,756 A | | 11/1969 | Sautter et al. | 132/73 |
| 3,584,572 A | | 6/1971 | Apicella | 101/27 |
| 3,629,034 A | | 12/1971 | Kuroda | 156/219 |
| 4,220,016 A | | 9/1980 | Frenger | 63/2 |
| 4,222,399 A | | 9/1980 | Ionescu | 132/73 |
| 4,294,260 A | | 10/1981 | Veatch | 128/654 |
| 4,361,160 A | | 11/1982 | Bryce | 132/73 |
| 4,520,064 A | | 5/1985 | Kanzelberger | 428/199 |
| 4,581,088 A | | 4/1986 | House | 156/219 |
| 4,594,276 A | | 6/1986 | Relyea | 428/40 |
| 4,935,268 A | | 6/1990 | Föll | 428/15 |
| 5,081,853 A | | 1/1992 | Salyer | 63/12 |
| 5,239,840 A | | 8/1993 | Sutterlin | 63/2 |
| 5,255,417 A | | 10/1993 | Herman | 24/113 |
| 5,622,587 A | | 4/1997 | Barthelman | 156/251 |
| 5,632,973 A | | 5/1997 | Keller | 424/61 |
| 5,675,989 A | | 10/1997 | Abraskin | 63/41 |
| 5,782,638 A | | 7/1998 | Warren, III et al. | 433/206 |
| 6,136,399 A | * | 10/2000 | Swarovski | 428/42.1 |

* cited by examiner

*Primary Examiner*—Daniel Zirker
(74) *Attorney, Agent, or Firm*—Cislo & Thomas LLP

(57) ABSTRACT

An applique for application to a body part, which comprises a thin flexible film having an array of decorative stones or gems adhesively secured on the upper surface and wherein the bottom surface of said applique has a self-adhesive layer.

4 Claims, 1 Drawing Sheet

Fig. 1.
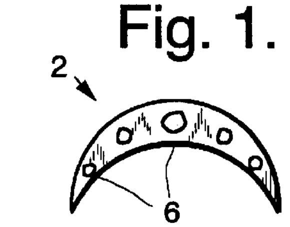
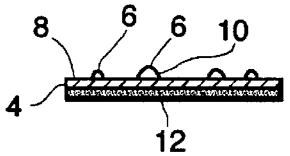
Fig. 2.
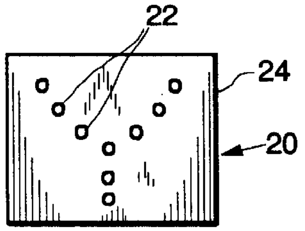
Fig. 3.
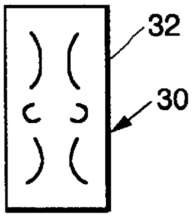
Fig. 4.
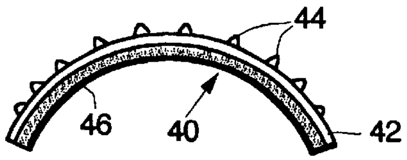
Fig. 5.
Fig. 6.
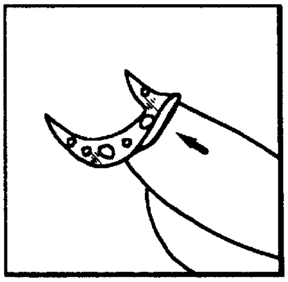
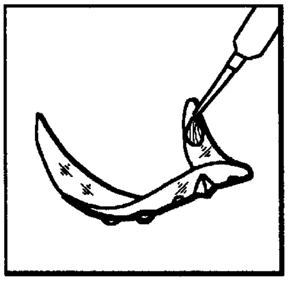
Fig. 7.
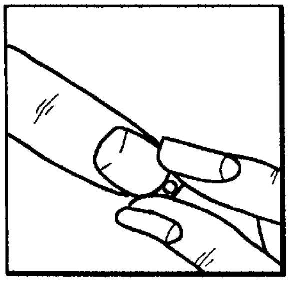
Fig. 8.
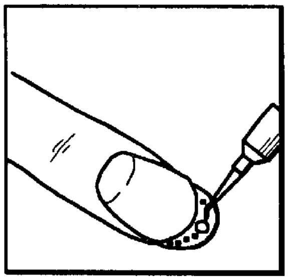
Fig. 9.
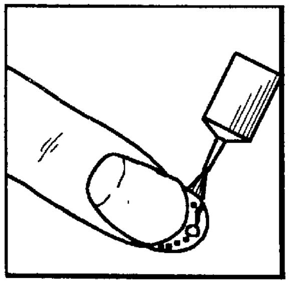
Fig. 10.

BODY APPLIQUE AND METHOD THEREFOR

CROSS-REFERENCES TO RELATED APPLICATIONS

This is a regular utility patent application predicated upon Provisional Patent Application Ser. No. 60/137,263 filed Jun. 2, 1999 and entitled FINGERNAIL BINDI AND THE LIKE, the entirety of which is hereby incorporated by reference.

BACKGROUND OF THE INVENTION

1. Field of the Invention

This invention relates to a decorative and ornamental set of jewelry motifs, or appliques, that are pre-assembled and attached to a thin film, and may easily be adhered or attached to the body, toe nail, finger nail or eye lid of the wearer. These jewelry motifs include decorative and colorfiil arrangements of stones, wire, plastic, and the like, or a combination thereof.

The term "applique" as used throughout this specification and its appended claims, is intended to also refer to decals with designs comprised of wiring attached thereon; decals with one or more stones or the like attached thereon, decals with a combination of stones, wiring, or the like attached thereon, self-adhesive body, fingernail, toe nail, and eyelid jewelry, and the like.

The term "stone" as used throughout this specification and its appended claims, is also intended to refer to gem stones, synthetic gem stones, rhinestones, plastic emulated stones, small beads, plastic in various geometric embodiments, which may be cylindrical, oval, spherical, semi-spherical, triangular, square, or other classical or more contemporary shapes.

2. Description of the Related Art

Heretofore, body parts, toe nails, fingernails and eye lids have been adorned with fingernail polish, air brushing, thin film water stencils, eye liner, and jewelry-like objects like metal wire that in some cases may be fastened or pasted onto the body parts, toe nails, fingernails and eye lids. A more recent fingernail industry fad is to attach rhinestones directly to the fingernail with a glue, to give the fingernail a decorative effect. These processes of decorating the fingernail can be complicated and time-consuming, and may not have the aesthetically desired results. Furthermore, the attaching means may damage the fingernail and surrounding tissues, with piercings, holes, excessive applications of glue or cement, and the like.

The following prior art was found in a patent search, but non detract from the patentability of the herein disclosed invention.

U.S. Pat. No. 5,782,638 Issued to Warren, III et al.

This reference is directed to an ornamental film article for dental substrate decoration and a dental substrate decorated therewith. FIG. 12 is a cross-sectional side elevation view of the applique article 300 of FIG. 11, shown as adhesively bonded to a dental substrate 322. The applique article 300 comprises a metal foil body 301 adhesively bonded to the front surface 324 of a dental substrate 322 by adhesive 320. By such mounting of the applique 300 on the front surface 324 of the dental substrate 322, the main top surface 302 of the applique, bearing the decorative indicia thereon, as shown in FIG. 11, is presented to front view as a decorative artifact on the dental substrate surface 324.

U.S. Pat. No. 4,581,088 Issued to House

This reference is directed to finger jewels. FIG. 8 is a cross-sectional view of the imitation set jewel 20, taken along lines 8—8 of FIG. 7. The beveled edge 19 of the imitation set jewel 20 has been coated by the metal 10 from the heat transfer foil 3. This coating 10 acts to accentuate the edge 19 of the jewel 20, as well as to give the jewel 20 an appearance of depth. The fact that the center portion 18 of the surface of the jewel 20 is not coated with the metal 10 creates the appearance of a gem set within a metal perimeter. FIG. 8 further shows the adhesive layer 13 which binds the jewel to the paper liner 14 so that the jewel 20 may be easily transported during shipping. The adhesive 13 only weakly adheres the jewel 20 to the liner 14. This allows one to easily pry the jewel 20 from the paper liner 14 when one wishes to use the product for application, as shown in FIG. 9.

U.S. Pat. No. 4,594,276 Issued to Relyea

This reference is directed to printed, removable body tattoos on a translucent substrate. The removable body tattoos comprise a flexible, porous, non-woven compacted tissue or compacted fibrous translucent substrate having at least one surface, a printed image over said surface, and a pressure-sensitive adhesive on the other surface of the substrate. The substrate is a film or sheet material which may effectively be of any polymeric film, as long as the substrates are translucent. The printed image may be partially precut so that the edge of the applique is the perimeter of the image, or any shape may be cut so that the transparency of translucency of the backing without printing thereon allows the image to stand out.

U.S. Pat. No. 4,220,016 Issued to Frenger

This reference is directed to skin jewelry. The jewelry of this system is worn on the skin of the wearer. The adhesive layer 14 adheres the flexible and resilient material of sheet 12 to the skin of the wearer. The resilient and flexible material of sheet 12 is securely attached to the remaining portions of the jewelry 2. The jewelry 2 comprises an outer retainer 4, a decorative jewel 6, a back plate 8, a layer 10 of adhesive, a sheet 12 of flexible and resilient material, and a second layer 14 of adhesive.

U.S. Pat. No. 5,239,840 Issued to Sutterlin

This reference is directed to a decorative insert for artificial fingernails. FIG. 3 shows a lateral view of a decorative insert placed into an artificial fingernail 8. FIG. 4 shows a front view of an inserted decorative insert. It can be seen that the lower edge 3 of the upper part 2 and the upper edge 6 of the base foot edge 5 are formed to follow the curvature of the artificial fingernail, and thus, the decorative insert is securely maintained in the artificial fingernail.

A primary application for the present invention is to decorate and adorn a body part, toe nail, fingernail or eye lid in a new and useful manner, and with relative ease and in a timely manner.

OBJECTS OF THE INVENTION

In trying to solve the above-described industry problems and disadvantages, and within the scope of this objective, the invention addresses the above-described problems and disadvantages which solutions need not be expensive or involve complex technology.

The advantages of a simple embodiment of the present invention include:

1. The appliques of the invention are inexpensive to manufacture.
2. The appliques of the invention are easily pre-assembled with a jewelry design motif, and do not require the storage of a number of jewelry and rhinestone accessories to make the invention functional.

3. The appliques of the invention are easy to apply to the fingernail, as it is designed to be in a pre-assembled and ready-to-apply state when purchased.
4. The appliques of the invention are a simpler and easier way of decorating a body part, toe nail, fingernail or eye lid as the decoration is on a self-adhesive applique, which may be attached directly with an adhesive of the type well known in the art and which of course is non-toxic. The appliques typically have raised objects attached to a thin film. These raised objects may include small decorative wires, stones, plastic pieces, or a combination thereof, and they are typically in arranged in an attractive and colorful jewelry motif.
5. The appliques of the invention are a quicker way of decorating a person's body, as the decorative jewelry motifs and designs are pre-assembled onto a thin film substrate, and may be applied directly onto the exposed surface of the body part, the nail, fingernail or eye lid, thereby affording the user an already decorated jewelry motif to be easily applied with one simple application of the applique. The user may use a top coat or bond applied over the applique where nail application is contemplated, thereby allowing the applique to be bonded to the nail for a longer period of time.
6. The appliques of the invention have a raised and textured appearance and feeling, and are therefore more aesthetically appealing.

Further objects, features, and advantages of the present invention will become more apparent from the following descriptions, when taken with the accompanying drawings that depict, for purposes of illustration only, various embodiment constructions in accordance with the present invention.

BRIEF DESCRIPTION OF THE DRAWINGS

The drawing figures reflect selected designs for the various embodiments for the instant invention, and as is intended for use in the nail and body adornment industry, but said invention is not limited to said use or applications.

FIG. 1 is a top plan view of a fingernail applique of the invention;

FIG. 2 is an enlarged side view of the applique shown in FIG. 1;

FIG. 3 is a plan view of a body applique;

FIG. 4 is an enlarged fingernail applique showing different configurations that may be used;

FIG. 5 is a schematic enlarged view of the type of applique that may be used for applying the appliques to eye lids;

FIG. 6, FIG. 7, FIG. 8, FIG. 9 and FIG. 10 show a method of applying an applique of the invention to the fingernail.

DESCRIPTION OF THE BEST EMBODIMENT CONTEMPLATED

Referring now to the drawing figures, wherein like reference numerals are used to refer to like specific parts of the various Figures.

Generally the appliques of the invention comprise small rhinestones, colored glass or other motifs that may be attached to a thin film substrate wherein the thin film substrate has an adhesive backing, or other adhesive coating on the surface opposite that upon which the jewelry motif taking various configurations is applied, usually by an adhesive.

The substrate, as indicated, comprises a polymeric, thin film and is generally transparent or translucent and which adequately supports or mounts the jewelry motif or design. The jewelry motif or design may be a collection of stones, wire or plastic, or anything else that may be aesthetically pleasing, and which may be attached and bonded to the top surface of the thin film or substrate so as to form the applique having an adhesive backing which applique may be attached to a body part, eye lids, toe nails or fingernails of the wearer.

The applique may take various forms, may be crescent shaped, rectangular, square, or any shape whatsoever, depending upon the end use to which the applique is to be put.

The jewelry design, or any design of the materials that are being supported on the thin film substrate, may take a variety of configurations and will be dictated solely by the creativeness of the designer, and of the particular mood or event that is sought to be accentuated.

For example, a motif may comprise stars, the American flag for fourth of July, and Christmas trees and the like for the holiday season, or any other type of motif.

Referring to FIGS. 1 and 2, there is illustrated a thin film of polymer material comprising a substrate 4 for the applique 2 wherein stones 6, colored or otherwise are adhesively applied to the top surface 8 of the thin film 4. The adhesive layer holding the stones 6 onto the surface 8 is designated 10. To the underside of the substrate, which in this instance is crescent shaped for application to a fingernail, there is a layer of adhesive 12 and it is to be understood that the applique 2 is adhered to a wax paper or the like backing, not shown, for ease of removal therefrom for application to fingernails or the like. The backing is the conventional type usually found with selfadhesive type labels and the like.

Referring to FIG. 3, an applique 20 is shown which in this particular instance is rectangular in shape and has an array of colored glass or stones 22 and which as in the case of the applique 2 may be placed on a body part so that when the substrate 24 of applique 20 is transparent only the Y symbol made up of the stones 22 is apparent.

In FIG. 4 there is illustrated an applique 30 taking an elongate configuration and which is adapted for placement onto false fingernails or the like and again comprises either a substrate 32 of transparent or opaque nature with design as shown thereon.

Referring to FIG. 5 there is illustrated an applique 40 for placement on the eye lid or lashes, and here again the substrate 42 supports an adhesive in a secured manner the spaced stones 44. The eye liner 40 is adhered to the eye lid or eye lash area of a wearer by reason of the adhesive layer 46.

The polymeric substrates of the invention may be any of those that are non toxic to the human body and which are thin and flexible and for the most part will be transparent although obviously opaque or colored transparencies may be desirable in some instances. The placement of the jewelry motif by way of stones, gems or whatever, may as previously indicated, take a wide range and variety, it only being necessary to keep in mind the end use to which the applique is to be utilized. Obviously where an eye liner such as 40 is contemplated, as shown in FIG. 5, the stones 44 should be of more minute size than for example those utilized in the body applique 20 for obvious reasons of support.

The adhesive utilized for securement of the gemstones or other materials on the upper surfaces of the appliques may be those adhesives that are known in the art which will not dissolve the polymeric film substrate and which will act to secure the rhinestones or other materials to the upper surface of the substrate in a secure manner. The adhesive used for the under side of the applique which is to have contact to either human body, eye lids, or nails should be non-toxic such as conventional and commonly found nail glues and these are well known in the prior art and all such materials, so far as they are compatible with the polymeric film may be utilized.

Generally the manufacturing process for applying the stones to the substrate would be to have the substrate cut or configured in the shape to which ultimately the applique would find most utilization and the stones or other matter making up the designs will be adhesively secured by hand, although machine placement is of course possible and desirable in some instances.

Referring to FIGS. 6, 7, 8, 9, and 10 there is shown the application of an applique of the invention as applying to a fingernail applique.

To remove the applique from the plastic sheet, gently take the edge of your fingernail and lift up the applique from the plastic sheet. Do not take the applique off by holding the top of the applique where the stones are, this will only make the stones and the other materials come off the applique. Once you have lifted up the bottom half of the applique from the plastic sheet, then you can gently but firmly hold the applique between your index finger and thumb and lift the remaining part of the applique from the plastic sheet.

There are 3 Ways of Securing the Applique to the Nails

All appliques have an adhesive on the back of them. This alone is not sufficient for long term use. Therefore, good nail glue is needed. For a good seal, place the nail glue on the back of the applique and then place the applique directly on to the nail or the acrylic nail. Hold the applique in place for about 30 seconds while the glue is drying. This will create a good seal.

The 2nd way put a coat of fingernail polish or a top coat on the nails before you apply the applique to your nails. Make sure that the fresh coat is clean and completely dry before applying the applique. Then follow the step in the 1$^{st}$ way. This way you adhere the applique to a coat of nail polish and not your nails directly. Although, in the 1$^{st}$ way the, seal lasts longer. Special note: some types of nail polishes and topcoats are not very suitable for nail glue to adhere to. To be sure that the products that you are using are compatible you should test them together before using them on your appliques.

The 3$^{rd}$ way, apply a fresh coat of fingernail polish or topcoat to the nails. While the nail polish or topcoat is drying apply the applique to the nails and the wet nail polish or topcoat. Hold the applique in place while the nail polish or topcoat is drying.

Once the appliques are properly secured to the nails then apply nail glue on top of the appliques where the stones and the other decorative materials are. Make sure that the glue is applied to the base of the stones and decorative materials. This will create a very strong hold on the stones to the plastic. Let the nail glue completely dry before the last step.

Once the nail glue is completely dry, then apply a clear topcoat on top of the applique. This will create a second and final seal for the applique and will protect it from snagging or breaking off from normal wear.

The wearer thus, may enjoy the applied appliques. If the wearer has followed all of the instructions properly, the applied appliques will last for up to two weeks.

What is claimed is:

1. An appliqué, polygonal in configuration for application to a body part comprising a substrate of a thin, polymeric transparent film having an upper surface and a bottom surface, the upper surface having one or a plurality of decorative members secured thereon and said bottom surface having at least a self-adhesive portion, said appliqué being carried by a member having a releasable surface whereby said appliqué may be pealed off and adhesively applied to said body part, said appliqué being configured for the nail of a human being and being crescent-shaped and shaped like a fingernail and wherein said bottom surface of said appliqué is entirely covered by said adhesive and said decorative members are colored stones.

2. The appliqué in accordance with claim 1, wherein said stones are arranged in one of a plurality of selected patterns.

3. The appliqué in accordance with claim 2, wherein said substrate is flexible.

4. The appliqué in accordance with claim 3 wherein said appliqué is opaque.

* * * * *